United States Patent
Fox et al.

(10) Patent No.: US 6,280,544 B1
(45) Date of Patent: Aug. 28, 2001

(54) RF TAG APPLICATION SYSTEM

(75) Inventors: Duane M. Fox, Snohomish, WA (US); David N. Bledsoe, Albuquerque, NM (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/296,161

(22) Filed: Apr. 21, 1999

(51) Int. Cl.[7] .............................. B32B 31/04; B32B 35/00
(52) U.S. Cl. ........................ 156/64; 156/249; 156/361; 156/379; 156/542
(58) Field of Search .............................. 156/64, 247, 249, 156/297, 277, 361, 362, 379, 384, 387, 540, 541, 542

(56) References Cited

U.S. PATENT DOCUMENTS

| | | | |
|---|---|---|---|
| 5,512,125 | * | 4/1996 | Momot et al. . |
| 5,614,278 | * | 3/1997 | Chamberlain et al. . |
| 5,660,663 | * | 8/1997 | Chamberlain et al. .......... 156/247 X |
| 5,867,102 | * | 2/1999 | Souder et al. . |
| 5,897,741 | * | 4/1999 | Mills et al. . |
| 6,019,865 | * | 2/2000 | Palmer et al. .................... 156/277 X |
| 6,123,796 | * | 9/2000 | Kathmann et al. .................. 156/249 |

* cited by examiner

Primary Examiner—Curtis Mayes
(74) Attorney, Agent, or Firm—Joan H. Pauly (57) ABSTRACT

A system includes a method and apparatus for printing labels and applying electronic tags, e.g. RF tags, to the labels, and also includes the resulting labels. The apparatus comprises a label media supply station that receives a strip of label media. The back face of the media may have adhesive thereon, which may be protected by a liner. The media is conveyed to a print station for printing on the front face of the media. A strip of RF tags is conveyed from a tag supply station to a tag application station downstream of the print station. At the tag application station, an electronic tag is applied to the back face of a label that has been printed at the print station. Preferably, a tag strip bar defines the location at which a tag is brought into contact with the back face. The bar is configured to provide a sharp turn in a pathway for a liner portion of the strip of tags. This separates the liner from the tag as the tag is applied to the label. The printing and tag application portions of the apparatus may be provided in a single unit or separately, for example as a preexisting printer and an attachment therefor.

14 Claims, 4 Drawing Sheets

FIG. 9

RF TAG APPLICATION SYSTEM

TECHNICAL FIELD

This invention relates to systems for labeling inventory, luggage of airline passengers, and other items. More particularly, it relates to methods and apparatus for applying an electronic tag to the back face of a label and to a label including an electronic tag.

BACKGROUND INFORMATION

There are many situations in which units of inventory and other items are labeled to assist in the identification and/or tracking of the items. The use of bar code labels on items for consumer purchase has become virtually universal. Bar code labels are also commonly used by shipping companies to identify packages being shipped. Another technique for identifying items is to apply radio frequency (RF) tags to the items. The tags may be active, i.e. transmit identifying signals without being queried by an outside source, or passive, i.e. provide an identifying signal only when activated by an inquiry signal. In the latter case, the inquiry signal is sufficient to energize the tag to enable the sending of the identifying signal. An advantage of RF tags, as opposed to bar codes, is that the orientation of the tag and the inquiring apparatus with respect to each other is non-critical in the case of the RF tags. An example of a type of RF tag is the tag sold by Texas Instruments under the trademark TIRIS. As used herein, the term "RF tag" is used broadly to include any type of magneto resonant tag.

The inventors perceived that it would be advantageous to embed RF tags into thermal or thermal transfer bar code labels or bar code labels produced by other printing processes. One approach would be to embed the tags at media conversion plants where the label media is prepared from large rolls of material by cutting the rolls into desired widths and, as appropriate, die cutting the reduced width sections of the rolls to produce the desired lengths of the labels. This approach has a number of serious drawbacks that make it impractical. First, several hundred different lengths and widths of die-cut labels are in common use. Label media and the material used to produce it typically include label stock, made from paper or plastic, having a front face for printing and an opposite back face with adhesive thereon, and a liner adjacent to the adhesive to prevent the adhesive from sticking to adjacent coils of label stock or other items prior to application of a label. The machinery required to apply RF tags between the labels and liner and then die cut the labels for all possible label sizes would be prohibitively expensive and complicated.

Another serious problem is that, once tags are applied to the labels, their additional and uneven thickness would cause serious problems in rewinding the converted stock into rolls. This drawback is present equally whether the conventional label stock/liner material is used or a type of linerless media is used. Because of considerations of waste and environmental protection, interest in use of linerless media has been increasing. The converted stock, with or without a liner, when wound into rolls, would have an uneven thickness that could cause the rolls to telescope. The increased thickness would also the reduce the number of labels which can be wound on a standard diameter roll to one-third the normal number. Another problem is that, in the current state of the technology, not every tag in a roll of tags is functional because of low production yields. If the tags are applied at the media conversion plant, each bad tag would result in the loss of a label.

Perhaps the most significant problem is the problem of printing over the tag area on a label that has a pre-applied RF tag. Even small RF tags occupy two square inches of area. Within this area, the overall media thickness increases from a nominal 0.007 inch (for label, liner and adhesive) to 0.011 inch. The portion of the tag on which the silicon chip is located is even thicker, with a nominal thickness of 0.022 inch. This last thickness would ordinarily require that no printing be allowed within a certain distance of the chip location. On small labels, this requirement could prevent any printing at all. The best situation that could be hoped for is that the labels would have to be reformatted to accommodate the "no-print zone". Such reformatting would cause additional time and expense and would be unacceptable to at least most customers of suppliers of printers and label media.

The present invention seeks to provide labels having electronic, e.g. RF, tags while avoiding the problems discussed above in relation to embedding the tags at the media conversion plant where the label media is prepared for sale and shipment to customers.

SUMMARY OF THE INVENTION

The present invention provides a system for printing labels and applying electronic tags to labels.

A subject of the invention is an attachment for a printer. According to an aspect of the invention, the attachment comprises a tag supply station configured to receive a strip of electronic tags, a tag application station, and a tag guide pathway. The tag application station is positioned to apply an electronic tag to the back face of a label that has been printed in the printer. The pathway for the strip of tags extends between the tag supply station and the tag application station.

As used herein, the term "electronic tag" includes any type of magneto resonant tag, as discussed above in relation to the term "RF tag" and, more generally, any type of magnetic or inductive tag or other tag having an electronic device, whether active or passive.

Preferably, each electronic tag has an adhesive-coated surface. It may be possible to provide the strip of electronic tags without including a liner by use of various techniques for handling adhesive-coated linerless media. Currently, it is anticipated that, in most instances in which the system of the invention is used, the strips of electronic tags will include a continuous liner and discrete tags with adhesive surfaces adjacent to the liner. The term "discrete" applies to strips of tags that have been die cut with possibly a small web of material remaining between adjacent tags, as well as strips in which the tags are fully physically separate, with or without a gap between adjacent tags, and are carried by the continuous liner. When the strips of tags are provided in a form including a liner, the attachment preferably further comprises a take-up roller for the liner. In the currently preferred embodiment, the tag application station includes a tag strip bar defining a location at which a face of a tag opposite said adhesive surface of the tag is brought into contact with adhesive on the back face of a label. The bar is configured to provide a sharp turn in a pathway for the liner at the location to strip the tag from the liner. As used herein, the term "strip bar" includes a very small radius roller or rod as well as the type of fixed member with a pointed or small radius strip point shown in FIG. 2 of this application.

The attachment is also preferably provided with features to help minimize the waste of labels and detect bad tags. One such feature that relates to RF tags is the provision of an RF write head positioned between the tag supply station and the tag application station. This feature allows the determination of what RF information is placed on the tag at the time the label is being prepared so that the information may be accurately coordinated with the needs of the particular situation. Another such feature is-the provision of an RF read station positioned downstream of the tag application station. This feature provides a verification of accurate RF information and also a means to detect immediately any problems that may be experienced with the functioning of the RF write head or the handling of the tag during the application procedure.

In an alternative waste-saving arrangement the sharp turn in the tag liner pathway is provided by a sharp edge portion of the tag strip bar. The tag strip bar is pivotable to pivot the sharp edge portion away from the contact location to prevent application of selected tags to labels. This feature may be used to prevent application of defective tags. In such case, a tag read station is preferably positioned between the tag supply station and the tag application station to detect defective tags. As used herein, the term "sharp edge portion" includes a small radius portion as well as a more pointed portion.

As mentioned above, the tag may be applied to adhesive on the back face of a label. As also mentioned above, the tag is preferably provided with an adhesive-coated surface. The surface of the tag opposite its adhesive-coated surface is brought into contact with the adhesive on the back face of the label. This results in a finished label/tag assembly that has a back surface that is at least substantially continuously adhesive-coated. Linerless technology may be employed to prevent undesirable sticking of the assembly following the application of the tag. A preferred feature of the attachment is an adhesive resistant transport belt extending from the tag application station to a label removal location. A sensor may be provided at the label removal location to detect removal of a finished label/tag assembly. Such a sensor would be particularly useful in an environment in which the labels are printed one at a time on demand.

Another subject of the invention is apparatus for applying electronic tags to labels. According to an aspect of the invention, the apparatus comprises a media supply station configured to receive a strip of label media including a strip of label stock having a front face and an opposite back face. The apparatus also includes a tag supply station configured to receive a strip of electronic tags, a tag application station, a media guide pathway for the media, and a tag guide pathway. The tag application station is positioned to apply an electronic tag to the back face of a label. The media guide pathway extends between the media supply station and the tag application station. The tag guide pathway for the strip of tags extends between the tag supply station and the tag application station.

The apparatus may further comprise a print station having a printhead for printing on the front face of the label media. The print station is positioned upstream of the tag application station and downstream of the media supply station.

The label media may include adhesive on the back face thereof. When the apparatus is used for processing label media that is adhesive coated and includes a liner, the apparatus preferably further includes a take-up roller for the liner portion of the label media and a label strip bar. The label strip bar is positioned upstream of the tag application station and, if applicable, downstream of the print station between the print station and the take-up roller. The bar is configured to provide a sharp turn in the pathway for the liner portion extending between the print station and the take-up roller to strip labels that have been printed from the liner portion.

Another subject of the invention is a method of forming labels having information on a front face thereof and also including an electronic tag. According to an aspect of the invention, the method comprises providing a strip of label stock having a front face and an opposite back face. The stock is fed to a tag application station. At the tag application station, an electronic tag is applied to the back face of the stock.

Adhesive may be provided on the back face of the label stock. In such case, applying the tag to the back face of the label preferably comprises bringing an inner face of the tag into contact with the back face, providing adhesive on an outer face of the tag opposite the inner face, and allowing the adhesive on the outer face to cooperate with the adhesive on the back face to form an at least substantially continuous adhesive coating on the back surface of the completed label/tag assembly. This feature provides a label/tag assembly that can reliably be adhesively secured to an item but is essentially the same size as a similar label not having an electronic tag. Other preferred features of the method include writing RF information to an RF tag before applying it to the label stock, reading the tag after applying it to verify the RF information, delivering the assembly by operating an adhesive resistant transport belt, and positioning a sensor to detect removal of a completed assembly. The method may also include changing the pathway of a strip of electronic tags to prevent a defective tag from reaching the tag application station.

As described above, the labels formed by the method of the invention have information on a front face thereof. As used herein, the term "information" includes information in various forms. It includes both human readable and machine readable information, and printed information and information embodied in a form other than printing. Printed information includes both human readable information and bar codes. Nonprint information includes, for example, magnetic or holographic information of the type commonly found on credit cards.

When the labels being formed by the method are to include printed information, the information may be preprinted on a strip of label stock. Alternatively, providing the strip of label stock may comprise providing a blank strip of label stock without information on the front face, and printing information. A printer is operated to feed the blank strip of label stock to a print station of the printer and print information on the front face of the stock at the print station. The printed stock is then fed to the tag application station.

Still another subject of the invention is label media. According to an aspect of the invention, the label media comprises a front face with information thereon, an opposite back face, and an electronic tag adhesively secured to the back face. Both the information and the electronic tag may take various forms, as discussed above. It is anticipated that in most cases the back face will have an at least substantially coextensive adhesive coating thereon, which coating secures the tag to the back face. The coating may cooperate with an adhesive surface of the tag to form an at least substantially continuous adhesive coating on the back surface of the media, also as described above.

The system of the invention provides an efficient and effective method of preparing labels that have information on a front face and also electronic tags. This is accomplished with relatively simple apparatus and at reasonable expense.

The resulting label/tag assemblies have dimensions at least substantially the same as non-tag-bearing labels so that their application to items to be identified and/or tracked is unaffected by the presence of the additional element of the tag. The provision of the preferred feature of an RF write head to write RF information to RF tags just before they are applied to the label stock greatly increases the versatility of the system. For example, the system may be used by airlines on luggage tags to facilitate identification and location of baggage without the need to orient particular items of baggage with respect to a scanner. The writing of the information contemporaneously with the printing of the label and, desirably, substantially contemporaneously with application of the label to luggage, allows the tag to be customized to include information about individual items of luggage that becomes known only at the time the luggage is checked with the carrier. Such individualized information may include, inter alia, the origin of the item, the destination of the item, and any special requirements for handling.

The advantages and features discussed above and other advantages and features will become apparent from the detailed description of the best modes for carrying out the invention that follows.

BRIEF DESCRIPTION OF THE DRAWINGS

In the drawings, like element designations refer to like parts throughout, and:

FIG. 4 is an elevational view of the label media and strip of RF tags and its associated strip bar shown in FIG. 2. In FIG. 4, the thicknesses of the elements of the tags and media is greatly exaggerated for the purposes of illustration.

FIG. 10 is a plan view of the front of a completed label/tag assembly constructed in accordance with the invention.

FIG. 11 is a plan view of the back of the assembly shown in FIG. 10.

BEST MODE FOR CARRYING OUT THE INVENTION

Figure 7:
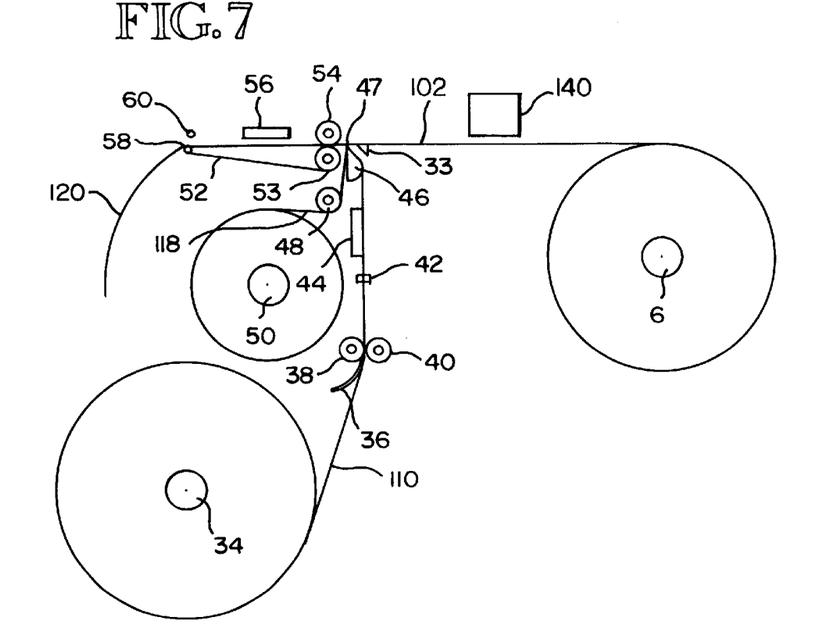
FIG. 7 is like FIG. 2 except that it shows another embodiment of apparatus for applying electronic tags to labels.

The drawings illustrate apparatus that is constructed in accordance with the invention and that constitutes the best modes for carrying out the apparatus aspects of the invention currently known to the applicants. The drawings also illustrate the best modes for carrying out the method aspects of the invention currently known to the applicants. The tag application portions of the apparatus of the invention may be provided in the form of an attachment for an existing printer, such as the attachment 30 illustrated in FIGS. 1 and 2. As shown, the attachment 30 is mounted on an existing thermal printer 2 in the same location and on the same mounting points as a cutter attachment would be installed. This is only one of a number of possible mounting arrangements for a tag application attachment. The invention also encompasses a printer that has, in its original manufacture, a tag applicator unit incorporated therein. Such printer/applicator devices could be designed to have certain advantages over a retrofit approach. These advantages may include reduced numbers of parts, simplified electronics and cabling, and larger tag capacities. The scope of the invention further encompasses tag application apparatus that stands alone and does not include printing elements. FIG. 7 illustrates one embodiment of such apparatus.

Figure 1:
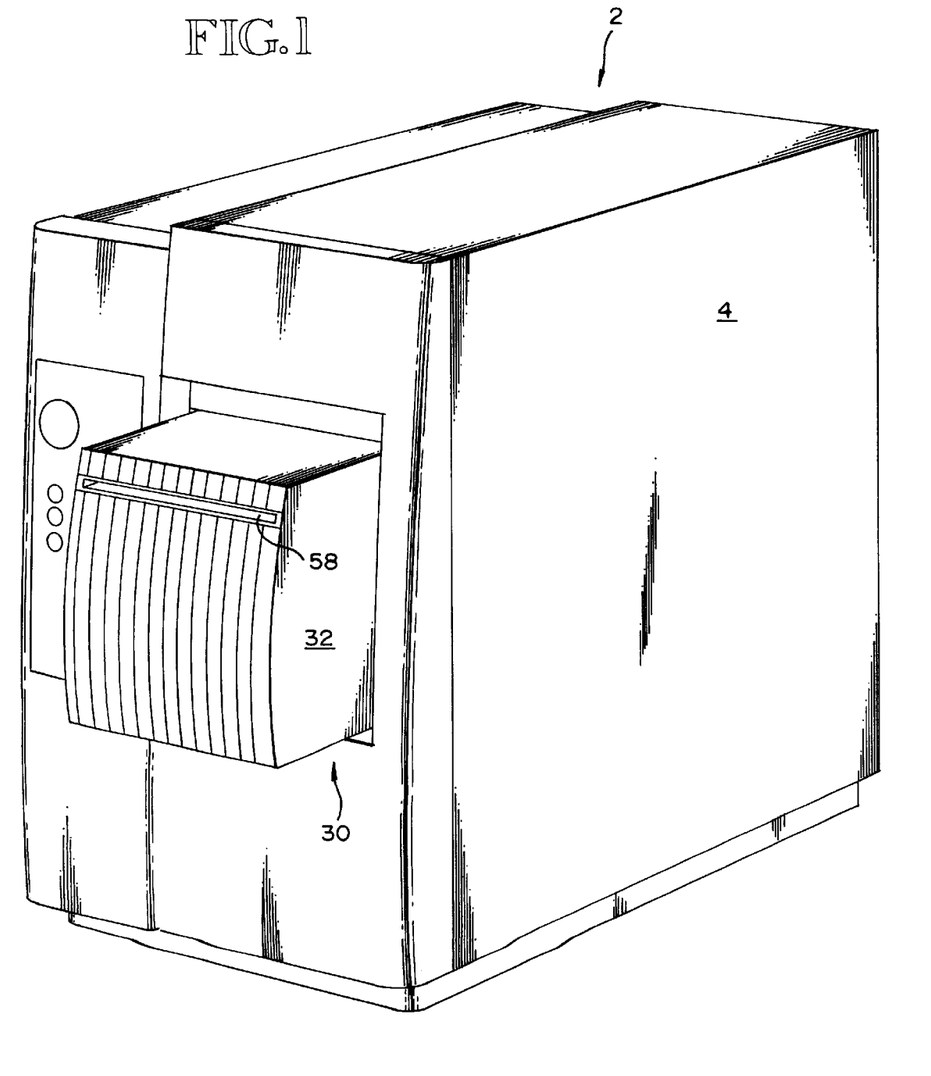
FIG. 1 is a pictorial view of a printer having an attachment constructed in accordance with the invention mounted thereon.
Figure 2:
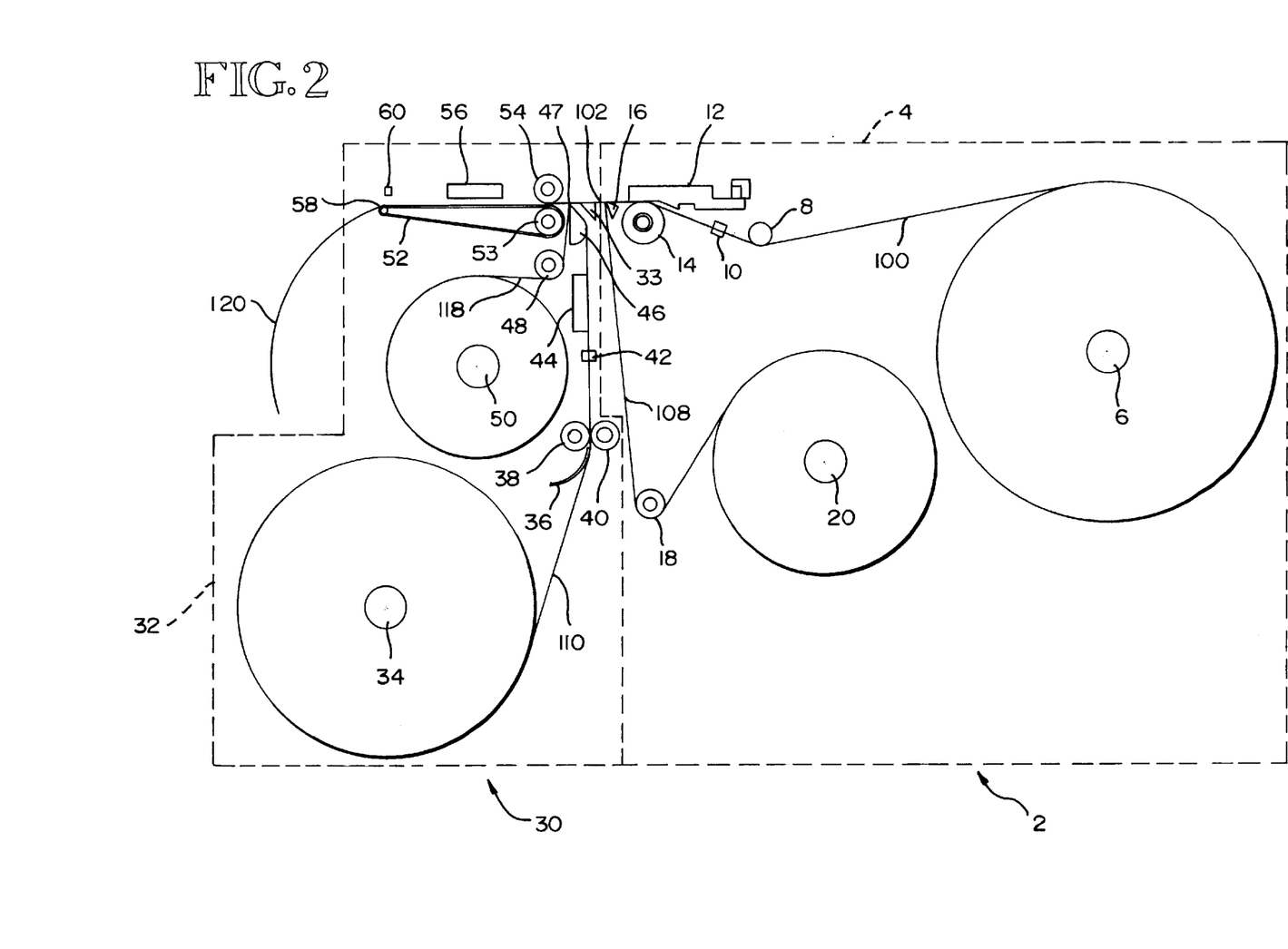
FIG. 2 is a schematic elevational view of the interior elements of the printer and attachment shown in FIG. 1.

Referring to FIGS. 1 and 2, the printer 2 has a housing 4 in which the working elements of the printer 2 are mounted. These working elements are illustrated in schematic form in FIG. 2. They include a media supply roller 6 for mounting rolls of label media 100. In the illustrated embodiment, the label media 100 includes a strip of label stock 102 having an adhesive coated back face protected by a liner 108. As mentioned above, in apparatus constructed according to the invention, a linerless label media may also be used. Still referring to FIG. 2, media 100 from the supply roller 6 is drawn from the supply roller 6 and extends along a media guide pathway around a guide roller 8 past a label gap sensor 10 to a print station having a printhead 12 for printing on a front face 104 of the label stock 102. The label gap sensor 10 detects in a known manner the downstream or leading edge of a label and measures the length of the label to accurately index the label with respect to the printhead 12 so that the printing on the label is properly positioned on the label. The printhead 12 may be one of various known types of thermal printheads or some other type of printhead, such as a dot matrix or laser printhead. At the location where the printhead 12 contacts the front face 104 of the label stock 102 to carry out the printing, the label stock 102 is backed by a platen roller 14 in a known manner.

Before the printed label media 100 exits the printer housing 4, the printed labels 102 are separated from the liner 108. This is accomplished by means of a label strip bar 16 that has a sharp or very small radius contact point at which the liner 108 bends around the strip bar 16 while the label stock 102 continues on a straight pathway out of the housing 4, as shown in FIG. 2. The liner 108 extends down around a liner strip drive roller 18 to a liner take-up roller 20. The drive roller 18 may be used to pull the label media 100 from the supply roller 6 and past the printhead 12. The separated label stock 102 exits the printer housing 4 through a preexisting opening.

The opening in the printer housing 4 is aligned with a corresponding entry opening in the housing 32 of the attachment 30. The label stock 102 enters the attachment 32 through the entry opening and extends across a support/guide member 33. Preferably, the surface of the member 33 that contacts the label stock 102 is adhesive resistant so that the stock 102 will not stick to the member 33. For example, the member 33 may be coated with a material such as the material sold under the trademark Teflon.

Figures 3, 5:
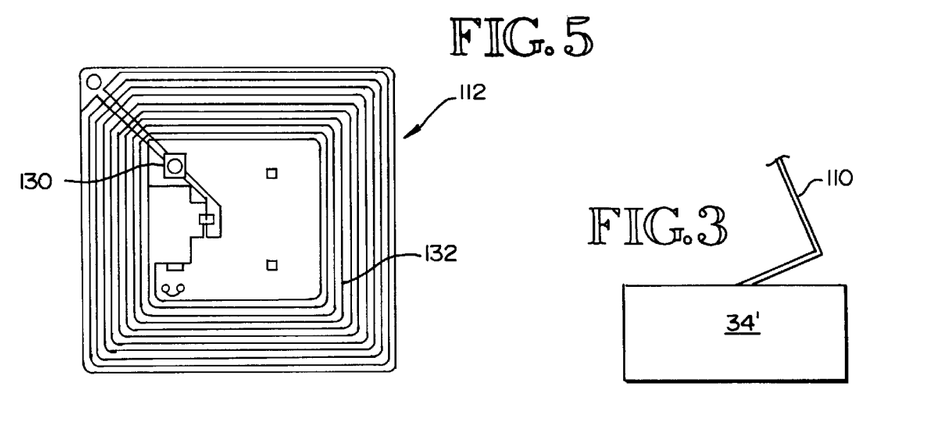
FIG. 3 is a fragmentary elevational view showing an alternative tag supply device.
FIG. 5 is a plan view of an individual RF tag.

The attachment 30 is provided with a tag supply station configured to receive a strip of electronic tags 110. As illustrated in FIG. 2, the tag supply station is configured to receive a strip of RF tags and is in the form of a tag supply roller 34 mounted inside the attachment housing 32. The supply roller 34 could also be mounted outside the housing 32. An alternative form of the tag supply station is shown in FIG. 3 in simplified form. Referring to FIG. 3, the tag supply station comprises a fan fold box 34'. The strip of RF tags 110 is supplied in a fan fold arrangement, rather than the rolled arrangement illustrated in FIG. 2. The box 34' may be attached to the bottom of the attachment shown in FIG. 1 or may be supported on a floor or table adjacent to the printer/attachment combination 2, 30. When the tag supply station is external of the attachment housing 32, the tag supply station may be regarded as the externally mounted or supported roller 34 or box 34' and/or as the opening in the bottom of the attachment 30 through which the strip of RF tags 102 is received into the attachment 30.

Like the label media, the strip of RF tags may be provided in a linerless form. However, in the illustrated embodiment, the strip of RF tags 110 includes a liner 118. Referring to FIG. 2, the strip 110 is drawn from the roller 34 and extends along a tag guide pathway that includes a curved guide plate 36 and guide rollers 38, 40 for guiding the strip 110. The guide rollers 38, 40 oppose each other in a known manner. The strip 110 extends from the rollers 38, 40 past a tag gap sensor 42 that verifies the location of the beginning of a tag and measures the length of the tag, in much the same manner that the label gap sensor 10 operates, to index the tag with the label to which it is to be applied. Past the sensor 42 is an RF write head 44 that electronically writes desired RF information onto a particular tag. This arrangement contemplates the tags being supplied in a nonfunctional form so that the tags can be customized at the point of use. In addition to indexing the tag location to the corresponding label, the sensor 42 ensures that the RF write head 44 is properly aligned with the tag.

The strip 110, including the liner 118, extends from the write head 44 to a tag strip bar 46 at a tag application station. The bar 46 is configured to provide a sharp turn in the pathway for the liner portion 118 of the strip 110 at a contact location 47 to strip the tag from the liner portion 118. At the contact location 47, the tag is brought into contact with adhesive 106 on the back face of the label 102. The adhesive 106 attaches the tag to the back face of the label 102, and the label/tag assembly continues to travel along the linear pathway over which the label stock 102 travels from the printhead 12 to the contact location 47. The liner 118 bends around the strip bar 46 and is separated from the tag in the same manner that the media liner 108 is separated from the label stock 102, as described above. The liner 118 extends down around a liner strip drive roller 48 to a liner take-up roller 50.

The label/tag assembly extends linearly from the contact location 47 to an adhesive resistant transport belt 52. The belt 52 is a known type of endless belt driven by a drive roller 53. Opposing the drive roller 53 is a laminating pressure roller 54 that exerts pressure on the label/tag assembly to ensure secure attachment of the tag 112 to the label 102. Adjacent to the upper run of the belt 52 along which the label/tag assembly is conveyed is an RF read head 56. The read head 56 verifies the information on the tag 112 and provides a quality check to ensure that the tag 112 has not been damaged by the procedure of applying it to the label stock 102. The label/tag assembly is conveyed to a label removal location 58 at the downstream end of the belt 52. FIG. 2 illustrates a finished label/tag assembly 120 extending outwardly and downwardly from the removal location 58. For situations in which individual assemblies are to be prepared on an on demand basis, a sensor 60 is preferably provided adjacent to the removal location 58. The sensor checks for the presence or absence of a completed assembly to verify when the assembly has been removed from the removal location 58.

Figures 4, 10, 11:
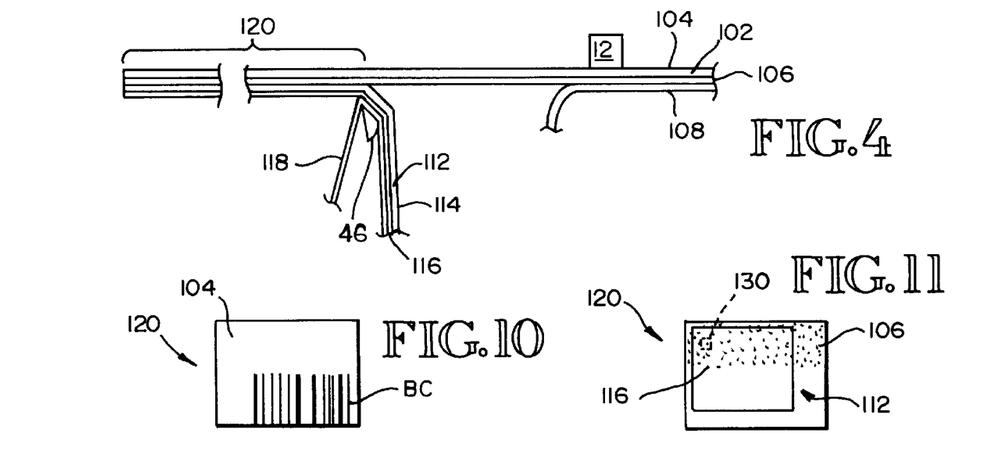

FIG. 4 illustrates in exaggerated detail the parts of the label media 100 and strip of RF tags 110 and the pathways the parts take as the materials 100, 110 pass through the apparatus 2, 30. Referring to FIG. 4, the label media 100 includes a strip of label stock 102 which has been die cut to separate the individual labels. The label stock has a front face 104 on which the printhead 12 prints information, such as bar code information. The back face of the label stock 102 opposite the front face 104 has adhesive 106 thereon. The adhesive 106 is protected by a liner 108.

Still referring to FIG. 4, the strip of RF tags 110 includes a layer of individual tags 112. The tags 112 are the same size as, or smaller than, the labels to which they are to be applied. The individual tags may be provided in the form of a substantially continuous strip of tag material that has been die cut to-separate the individual tags 112. It may also be provided with gaps between the individual tags 112. This may be desirable in situations in which the tags 112 are shorter in length than the labels to which they are to be applied. The inner face 114 of each tag 112 is brought into contact with the adhesive coated back face 106 of the corresponding label to apply the tag 112 to the label. Preferably, the opposite outer face of the tag 112 is also coated with an adhesive 116. With this arrangement, the finished label/tag assembly 120 has an at least substantially continuous adhesive coating on its back surface regardless of the relative sizes of the labels and tags. Prior to stripping the tag 112 from its liner 118 and applying the tag 112 to the label, the adhesive-coated outer face of the tag 112 is protected by the liner 118.

Figure 6:
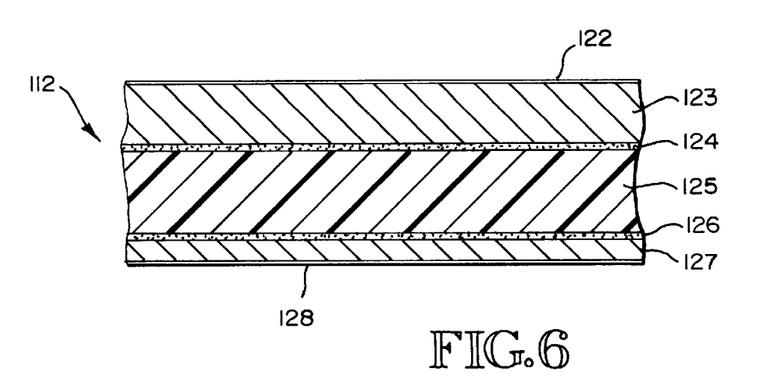
FIG. 6 is a fragmentary cross-sectional view of the tag shown in FIG. 5 illustrating, with greatly exaggerated dimensioning, the layers of the tag in the capacitor area.

FIGS. 5 and 6 illustrate the structure of a type of RF tag 112 manufactured by Texas Instruments. It is currently anticipated that a primary use of the system of the invention will be to apply tags of this type to bar code labels. FIG. 6 shows the cross section of a tag 112 in the capacitor area of the tag 112. Referring to FIG. 6, the two opposite surfaces of the tag 112 are each coated with gravure-resist ink. This ink helps protect the other layers of the tag against damage. Under the upper ink layer 122 is a top layer of aluminum 123. The lower surface of the aluminum 123 is secured to a base foil 125 by glue 124. It is anticipated that the base foil material will be polyester. The bottom surface of the base foil 125 is secured to a bottom layer of aluminum 127 by glue 126. The bottom layer 128 of gravure-resist ink is applied to the bottom surface of the bottom layer of aluminum 127. The aluminum layers 123, 127 provide the circuit components other than the silicon chip.

FIG. 5 shows a plan view of a typical tag 112. A substantial portion of the area of the tag 112 is occupied by the antenna 132, which is preferably provided in the winding configuration illustrated in FIG. 5. The most important portion of the tag 112, the silicon chip 130, is positioned in a corner portion of the center area of the tag 112 inside the windings of the antenna 132.

As noted above, a length difference in the tags 112 and the labels to which they are to be applied can be accommodated by the provision of gaps between the individual tags 112 on a strip 110 of tags. This approach to the problem of differential lengths may be possible but is likely to lead to undesirable complication of, and addition :to the cost of, preparing the strips of RF tags 110. Another possible solution is to drive the transport of the tag strips 110 and the label media 100 at different rates. The illustrated arrangement of separate liner strip drive rollers 18, 48 for the label media and the tag media, respectively, can accommodate this approach. For example, the transport of the tag strip 110 may be driven by a stepper motor and discontinued while the excess portion of the length of the label continues along the pathway onto the belt 52 so that the next tag 112 on the strip 110 will be properly positioned for the next label. When the next label reaches the tag strip bar 46, the transport of the tag strip 110 is recommenced.

FIG. 7 illustrates an embodiment of the invention that includes the media supply station, tag supply station, tag application station, and tag guide pathway shown in FIG. 2. The embodiment of FIG. 7 does not include the print station illustrated in FIG. 2 and has a modified media guide pathway that directly feeds media from the media supply roller 6 to the tag application station. As shown, the media stock 102 is provided without a liner. The stock 102 may be a type of linerless media with adhesive on the back face of the label stock 102 or may lack adhesive on the back face. If the stock 102 lacks adhesive, an adhesive layer may be provided on the surface of the tag that is applied to the back face of the stock 102 to secure the tag 112 to the stock 102. Alternatively, the embodiment of FIG. 7 could also include the media liner 108, label strip bar 16, liner strip drive roller 18, and liner take-up roller 20 shown in FIG. 2.

It is anticipated that the type of embodiment shown in FIG. 7, which lacks a printer or other means for placing information on the front face of the label stock 102, will be used in conjunction with media stock 102 into which information has been incorporated at a site remote from the location of the tag application apparatus. For example, the label stock 102 may include a strip of labels on the front faces of which has been printed bar code information or other machine readable or human readable information. The label stock 102 could also be provided with magnetic strips on the front face to provide the information in magnetic form. Further forms of the information are also possible. Referring to FIG. 7, the apparatus preferably includes a label reader 140 for reading the information on each label in the label stock 102. The reader 140 may be, for example, a bar code scanner or a magnetic stripe reader.

Figures 8, 9:
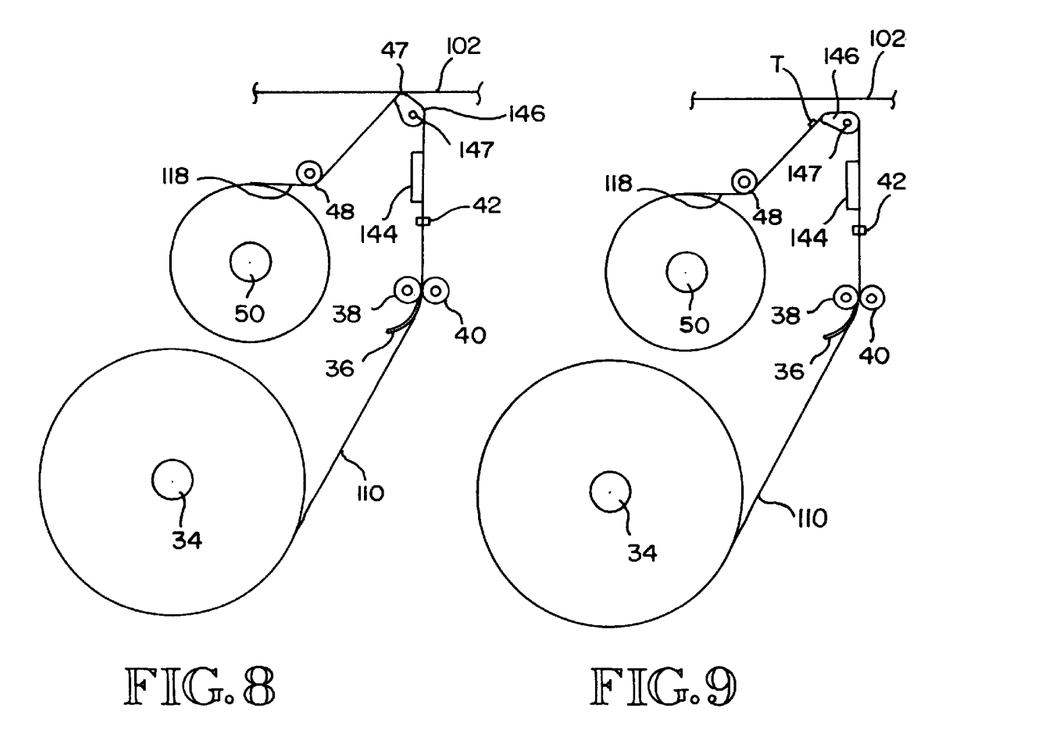
FIG. 8 is a schematic elevational view of a modified form of the portion of the apparatus of the invention for supplying and applying the tags.
FIG. 9 is like FIG. 8 except that it shows the pivotable tag strip bar in a different position to prevent application of a selected tag to a label.

FIGS. 8 and 9 illustrate another feature of the invention that may be provided to minimize waste of label stock. Referring to FIGS. 8 and 9, the apparatus includes a tag supply roller 34, guide plate 36, guide rollers 38, 40, tag gap sensor 42, liner strip drive roller 48, and liner take-up roller 50 as shown in FIGS. 2 and 7 and described above in connection with FIG. 2. The main difference between the tag application apparatus shown in FIGS. 8 and 9 and that shown in FIGS. 2 and 7 is the structure of the tag strip bar and the apparatus just upstream thereof. Referring to FIGS. 8 and 9, a tag reader 144 is positioned upstream of the tag application station in place of the RF write head 44 shown in FIG. 2 and described above. The tag reader 144 may be an RF read head or a device for reading an electronic tag other than an RF tag. In accordance with the invention, as each tag passes the tag reader 144, the reader 144 is operated to determine if the tag is defective. When a tag is found to be functional and not defective, it continues along the normal pathway to the tag application station around the tag strip bar 146 to the contact location 47 at which the tag is brought into contact with the back face of the label stock to be applied to the back face. This operation is the same as the operation of the embodiment shown in FIG. 2.

The advantage of the feature illustrated in FIGS. 8 and 9 is its capability of preventing a defective tag T from being applied to the label stock 102. For this purpose, the tag strip bar 146 is pivotably mounted on a pivot shaft 147. The bar 146 has a sharp edge portion, as shown a small radius portion, which provides the sharp turn in the pathway for the tag liner to strip the tag from the liner, as described above. When a defective tag has been detected, the bar 146 is pivoted about its pivot shaft 147 to pivot the sharp edge portion away from the contact location 47, as illustrated in FIG. 9. The pivoting of the bar 146 changes the pathway of the strip of tags to prevent the defective tag T from reaching the tag application station and being applied to the label stock 102. As can be seen in FIG. 9, the defective tag T remains on the liner 118 to be wound up with the liner 118 on the liner take-up roller 50. Once the defective tag T has moved away from a position in which it could be applied to the label stock 102, the bar 146 is pivoted back to the position shown in FIG. 8 to permit subsequent nondefective tags to be applied.

The system of the invention also encompasses label media that may be produced using the apparatus and method described above. FIGS. 10 and 11 illustrate the preferred embodiment of the label/tag assembly 120 of the invention. FIG. 10 shows the front face 104 of the assembly 120 on which bar code information BC has been printed. FIG. 11 shows the opposite back surface of the assembly. As can be seen in FIG. 11, the back face of the label stock portion of the assembly includes an adhesive coating 106 thereon. The coating 106 is at least substantially coextensive with the back face and serves to secure the tag 112 to the back-face. The surface of the tag 112 opposite the back face also has adhesive 116 thereon. The adhesive 116 on the tag 112 cooperates with the adhesive 106 on the label stock 102 to form an at least substantially continuous adhesive coating on the back surface of the label media formed by the label/tag assembly.

The method and apparatus described above may be varied in a number of ways without departing from the spirit and scope of the invention. One possible feature is reading the tag before it is applied to the label so that bad tags can be discarded without wasting label stock. FIGS. 8 and 9 illustrate an embodiment of this feature, as described above. This feature is particularly useful since, under the current state of the technology, the occurrence of bad tags that are not written properly or cannot be read properly is about four percent. In addition to saving label stock, checking the tags before application will also eliminate the need to reprint bad laminated labels. Another possible variation is to use tags that are not die cut and do not have adhesive or liner applied. In such embodiments, a cutter could be used to cut each individual tag before applying it to the label. This approach would have the advantage of reducing the cost of tag material but could not be used on relatively small labels since the tag would cover too much of the label's adhesive surface for the label to adhere properly to an item to which it is applied. The system of the invention may be used in connection with batch printing as well as on demand printing. For batch printing, instead of winding the label liner onto a take-up roller, the liner could be routed under the tag application station. Rollers would then reapply the label with the tag to the liner and the completed assemblies on the liner would either be fed out in small groups for tear off or rewound on a powered rewinder for larger batches.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A method of forming labels having information on a front face thereof and also including an electronic tag, comprising:

providing a strip of label stock having a front face with information thereon and an opposite back face, and providing adhesive on said back face;

feeding the strip of label stock to a tag application station; and at the tag application station, applying an electronic tag to the back face of the stock, including applying the tag to said back face by bringing an inner face of the tag into contact with said back face, providing adhesive on an outer face of the tag opposite said inner face, and allowing the adhesive on said outer face to cooperate with the adhesive on said back face to form an at least substantially continuous adhesive coating on the back surface of the completed label/tag assembly; and delivering the completed label/tag assembly to a removal location by operating an adhesive resistant transport belt.

2. The method of claim 1, further comprising positioning a sensor adjacent to said removal location to detect removal of the completed label/tag assembly.

3. A method of forming labels having information on a front face thereof and also including an electronic tag, comprising:

providing a strip of label stock having a front face with information thereon and an opposite back face, and providing adhesive on said back face;

feeding the strip of label stock to a tag application station;

at the tag application station, applying an electronic tag to the back face of the stock, including applying the tag to said back face by moving a strip of electronic tags along a pathway to the tag application station and bringing an inner face of a tag on said strip of tags into contact with said back face; and detecting a defective tag, and changing said pathway to prevent the defective tag from reaching the tag application station.

4. A method of forming labels having information on a front face thereof and also including an electronic tag, comprising:

providing a strip of label stock having a front face with information thereon and an opposite back face;

feeding the strip of label stock to a tag application station;

providing a plurality of tags and reading the tags to detect defective tags;

diverting defective tags away from the tag application station; and at the tag application station, applying an electronic tag that has been read and not found to be defective to the back face of the stock.

5. A method of forming labels having information on a front face thereof and also including an electronic tag, comprising:

providing a strip of label stock having a front face with information thereon and an opposite back face;

feeding the strip of label stock to a tag application station;

at the tag application station, applying an electronic tag to the back face of the stock; and downstream of the tag application station, reading the tag to detect damage to the tag caused by application of the tag to the stock.

6. An attachment for a printer comprising:

a tag supply station configured to receive a strip of electronic tags;

a tag application station positioned to apply an electronic tag to the back face of a label that has been printed in the printer; and a tag guide pathway for the strip of electronic tags extending between the tag supply station and the tag application station;

wherein the attachment can accommodate strips of electronic tags including a continuous liner and discrete tags with adhesive surfaces adjacent to the liner; and the tag application station includes a tag strip bar defining a location at which a face of a tag opposite said adhesive surface of the tag is brought into contact with adhesive on the back face of a label, said bar being configured to provide a sharp turn in a pathway for the liner at said location to strip the tag from the liner; and wherein said sharp turn is provided by a sharp edge portion of said tag strip bar, and said tag strip bar is pivotable to pivot said sharp edge portion away from said location to prevent application of selected tags to labels.

7. The attachment of claim 6, wherein the tag supply station comprises a fanfold box.

8. The attachment of claim 6, further comprising a tag read station positioned between the tag supply station and the tag application station to detect defective tags.

9. An attachment for a printer comprising:

a tag supply station configured to receive a strip of electronic tags;

a tag application station positioned to apply an electronic tag to the back face of a label that has been printed in the printer;

a tag guide pathway for the strip of electronic tags extending between the tag supply station and the tag application station; and an adhesive resistant transport belt extending from the tag application station to a label removal location;

wherein the attachment can accommodate strips of electronic tags including a continuous liner and discrete tags with adhesive surfaces adjacent to the liner; and wherein the tag application station includes a tag strip bar defining a location at which a face of a tag opposite said adhesive surface of the tag is brought into contact with adhesive on the back face of a label, said bar being configured to provide a sharp turn in a pathway for the liner at said location to strip the tag from the liner.

10. The attachment of claim 9, further comprising a sensor at the label removal location to detect removal of a finished label.

11. Apparatus for applying electronic tags to labels, comprising:

a media supply station configured to receive a strip of label media including a strip of label stock having a front face and an opposite back face;

a tag supply station configured to receive a strip of electronic tags;

a tag application station positioned to apply an electronic tag to said back face of a label;

a media guide pathway for the media extending between said media supply station and said tag application station; and a tag guide pathway for the strip of electronic tags extending between the tag supply station and the tag application station;

wherein said apparatus is adapted to apply, at said tag application station, a tag to adhesive on said back face of a label;

wherein the tag application station includes a tag strip bar defining a location at which a tag is brought into contact with adhesive on the back face of a label, said bar being configured to provide a sharp turn, at said location, in a pathway for a liner portion of the strip of electronic tags to strip the tag from the liner portion; and wherein said sharp turn is provided by a sharp edge portion of said tag strip bar, and said tag strip bar is pivotable to pivot said sharp edge portion away from said location to prevent application of selected tags to labels.

12. The apparatus of claim 11, further comprising a tag read station positioned between the tag supply station and the tag application station to detect defective tags.

13. Apparatus for applying electronic tags to labels, comprising:

a media supply station configured to receive a strip of label media including a strip of label stock having a front face and an opposite back face;

a tag supply station configured to receive a strip of electronic tags;

a tag application station positioned to apply an electronic tag to said back face of a label;

a media guide pathway for the media extending between said media supply station and said tag application station;

a tag guide pathway for the strip of electronic tags extending between the tag supply station and the tag application station; and an adhesive resistant transport belt extending from the tag application station to a label removal location;

wherein said apparatus is adapted to apply, at said tag application station, a tag to adhesive on said back face of a label.

14. The apparatus of claim 13, further comprising a sensor at the label removal location to detect removal of a finished label.

* * * * *